US011148341B2

(12) United States Patent
Schmitz

(10) Patent No.: US 11,148,341 B2
(45) Date of Patent: Oct. 19, 2021

(54) METHOD FOR EVALUATING AT LEAST ONE INDUSTRIAL PROCESS

(71) Applicant: Windmöller & Hölscher KG, Lengerich (DE)

(72) Inventor: Torsten Schmitz, Greven (DE)

(73) Assignee: Windmöller & Hölscher KG, Lengerich (DE)

( * ) Notice: Subject to any disclaimer, the term of this patent is extended or adjusted under 35 U.S.C. 154(b) by 67 days.

(21) Appl. No.: 16/091,772

(22) PCT Filed: Feb. 9, 2017

(86) PCT No.: PCT/EP2017/052830
§ 371 (c)(1),
(2) Date: Oct. 5, 2018

(87) PCT Pub. No.: WO2017/174232
PCT Pub. Date: Oct. 12, 2017

(65) Prior Publication Data
US 2019/0054677 A1 Feb. 21, 2019

(30) Foreign Application Priority Data

Apr. 8, 2016 (DE) .................... 10 2016 106 523.4
Oct. 7, 2016 (DE) .................... 10 2016 119 110.8

(51) Int. Cl.
*G05B 19/418* (2006.01)
*B29C 48/92* (2019.01)
*B29C 48/08* (2019.01)
*B29C 48/10* (2019.01)
*B29C 48/00* (2019.01)
*B29C 48/28* (2019.01)

(52) U.S. Cl.
CPC ............ *B29C 48/92* (2019.02); *B29C 48/001* (2019.02); *B29C 48/0017* (2019.02);
(Continued)

(58) Field of Classification Search
CPC ............. B29C 48/001; B29C 48/0017; B29C 48/0018; B29C 48/0019; B29C 48/0023;
(Continued)

(56) References Cited

U.S. PATENT DOCUMENTS 5,178,806 A 1/1993 Predohl
2003/0158795 A1* 8/2003 Markham ........ G05B 19/41875
705/28

(Continued)

FOREIGN PATENT DOCUMENTS

DE 102011118609 A1 5/2013
EP 2514580 A2 10/2012
(Continued)

OTHER PUBLICATIONS

International Search Report and Written Opinion dated May 4, 2017, for PCT Application No. PCT/EP2017/052830 with its English translation.
(Continued)

*Primary Examiner* — Chad G Erdman
(74) *Attorney, Agent, or Firm* — Rudy J. Ng; Bret E. Field; Bozicevic, Field & Francis LLP

(57) ABSTRACT

The invention relates to a method (100) for evaluating at least one industrial process for the film production of a film and/or for the further processing using the film, comprising at least one production device (20) which is operated for the production of the film, and at least one further processing device (30) which is operated for further processing using the film.

32 Claims, 4 Drawing Sheets

Figure 1:
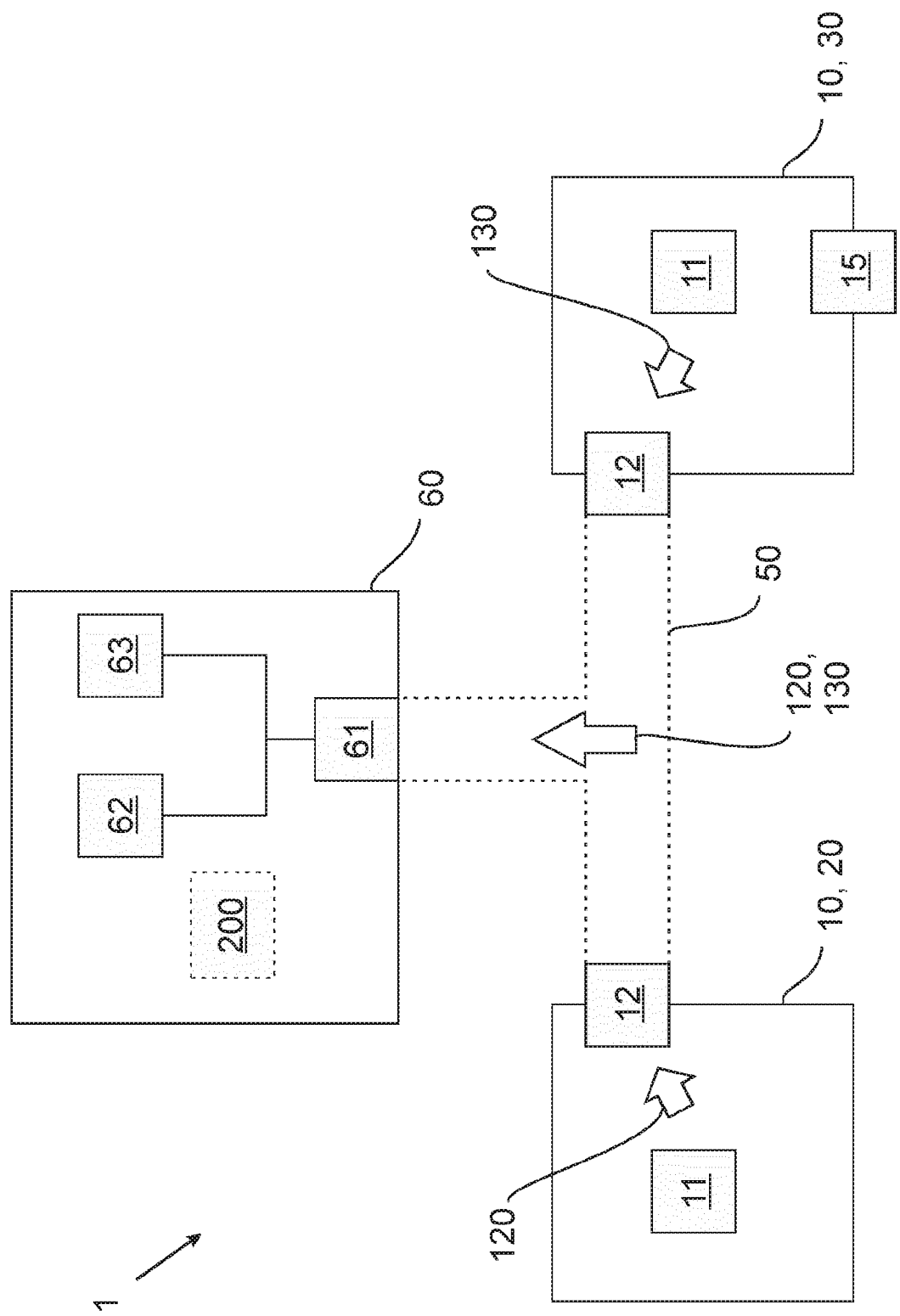

(52) U.S. Cl.
CPC ...... *B29C 48/0018* (2019.02); *B29C 48/0019* (2019.02); *B29C 48/0023* (2019.02); *B29C 48/08* (2019.02); *B29C 48/10* (2019.02); *B29C 48/28* (2019.02); *G05B 19/41875* (2013.01)

(58) Field of Classification Search
CPC ......... B29C 48/08; B29C 48/10; B29C 48/28; B29C 48/92; G05B 19/41875
See application file for complete search history.

(56) References Cited

U.S. PATENT DOCUMENTS

| | | | |
|---|---|---|---|
| 2011/0028293 A1* | 2/2011 | Atkin ..................... | G06F 17/00 493/374 |
| 2017/0217226 A1* | 8/2017 | Bigott ................ | G03G 15/6544 |

FOREIGN PATENT DOCUMENTS

| | | |
|---|---|---|
| WO | WO2010047811 A2 | 4/2010 |
| WO | WO2013185120 A1 | 12/2013 |

OTHER PUBLICATIONS

Spirgatis et al., Optische Qualität von Folien, Kunststoffe, Bd. 91, 5, pp. 34-39, May 31, 2001; English abstract enclosed.
Examination Report for European Application No. 17705820.3 dated May 26, 2021, with its English summary, 10 pages.

* cited by examiner

METHOD FOR EVALUATING AT LEAST ONE INDUSTRIAL PROCESS

The present invention relates to a method according to the type further defined in the present disclosure. The invention further relates to a system, a processing device, as well as to a computer program product.

It is known from the prior art that, in a process for film production, in the production devices thereby employed, e.g. for the production of cast- or blown films, samples are taken by random sampling for quality control. These samples are subsequently examined, e.g. by means of a tensile test or a puncture test. Examinations are also carried out, which already are close to the real-world conditions of a further processing with the film (in further processing devices like stretch-wrapping machines). The result of this testing can, for example, serve to evaluate the production (or of the film as a product of the film production), or also has influence on process parameters on the application side (i. e. in the further processing with the film).

However, the evaluations resulting therefrom are often not optimal, or can only be used point-by-point and/or insufficiently for the application side. Further, the examinations are complicated and involve high costs. Moreover, it is often not possible to quickly and simply optimize the process parameters in the film production and further processing.

It is therefore an object of the present invention to at least partly resolve the above-described disadvantages. In particular, it is an object of the present invention to enable an improved evaluation of at least one industrial process for film production of a film and/or further processing with the film possible. In addition, in particular the evaluation and/or an optimization of the film production and/or further processing should occur more quickly, reliably, and/or cost-effectively. Further, in particular the process security and/or process stability should be improved.

The above object is achieved by a method with the features of the present disclosure, a system with the features of the present disclosure, a processing device with the features of the present disclosure, as well as by a computer program product with the features of the present disclosure. Further features and details of the invention result from the respective dependent claims, the description, and the drawings. Here, features and details, which are described in conjunction with the method according to the invention, of course also apply in conjunction with the system according to the invention, the processing device according to the invention, as well as the computer program product according to the invention, and vice versa, so that, with respect to the disclosure of the individual aspects of the invention, reference always is or can be made mutually.

The object is, in particular, achieved through a method for evaluating at least one industrial process for film production of a film and/or further processing with the film. The further processing with the film here includes e.g. also a further processing of the film itself, or a further processing of other products, wherein the film is thereby used, e.g. as packaging material.

Preferably, at least one production device, which is operated for the film production of the film, and at least one further processing device, which is operated for the further processing with the film, is provided here. In particular, the production device here is arranged independently of the further processing device, in particular arranged spatially separated, in particular at a different geographical location, e.g. spaced at a distance of 10 m or at least 100 m or at least 1000 m or at least 100 km, so that in particular the film production and further processing can be regarded as (two separate and/or temporally separate) sub-processes of an (overall) process across different sites. Alternatively, the film production and the further processing can be carried out directly following one another at a common site. The first sub-process here includes e.g. the production of one or multiple films through the production device, and the second sub-process includes e.g. the further processing of these films through the further processing device. Here, multiple production devices can also be provided, preferably for the first sub-process (the film production), which production devices cooperate with one another in order produce a first sub-process product (e.g. the film). Likewise, multiple further processing devices can also be provided, preferably for the second sub-process (the further processing), which further processing devices cooperate with one another, in order to create a second sub-process product (e.g. a product packaged with the film and/or a printed film), in particular as an (overall) process product.

According to the invention, it is in particular provided, that at least one of the following steps is conducted (e.g. in-process), e.g. in chronological order, or in any desired order:

determining production process data on the production device, e.g. on a film machine or the like, in the film production (the film), determining of further processing process data on the further processing device, e.g. on a stretch-wrapping machine, and/or on a lining and laminating machine, and/or on a printing machine, and/or on a metallizer, and/or a deep-drawing machine, and/or on a rewinder, or the like, in the further processing (with the and/or on the film), carrying out a data transmission for providing the production process data, and/or the further processing process data, determining a correlation between the production process data and the further processing process data, wherein at least one evaluation criterion is assessed, and/or the correlation (i.e. e.g. a correlation result of the determination of the correlation) is compared with the at least one evaluation criterion, so that an evaluation result is determined and/or can be determined, providing of the evaluation result and/or of the process data, in particular the production process data and/or the further processing process data.

In other words, process data are preferably determined in the film production, as well as also in the further processing, in particular (intermittently) stored, and assessed, in order to determine a correlation between the production process data and the further processing process data. This in particular has the advantage that, instead of insufficient separate laboratory testing, the real-world sub-process of the further processing can serve to inspect the film production. In particular, in the film production, the production of a film is effected, which is directly further processed in the further processing, and/or is used to process a product (e.g. for packaging). In particular, the term film refers to a plastic film here.

Under the provision of information and/or data, such as the evaluation result, and/or the process data (that is, e.g. the production process data and/or the further processing process data), in particular a provision of digital data and/or a (digital) data transmission, and/or a data exchange, and/or a provision as a download, and/or a storing on a(n) (e.g. electronic) data carrier, and/or a display of the data (such as the evaluation result) on e.g. a display and/or control device, and/or a webpage, and/or a printing out of the information in readable form is to be understood. It is in particular conceivable that the provision occurs readably for people, or exclusively machine-readably (e.g. encoded). It can also be possible that the information and/or data are provided in encrypted form.

Preferably, the providing and/or the data transmission can occur via a communication- and/or data and/or radio- and/or network- and/or mobile radio- and/or internet connection. The communication connection includes e.g. an internet connection, e.g. via mobile radio communication and/or the like. In particular, the data transmission occurs here via a transmitting system, e.g. a network. The network includes for example the internet, and/or a global network, and/or a WAN (Wide Area Network), and/or a MAN (Metropolitan Area Network), and/or a LAN (Local Area Network), and/or a GAN (Global Area Network), and/or a mobile radio network, and/or a radio connection, and/or a bus system, and/or a WLAN (wireless LAN), and/or the like.

Advantageously, the term "accompanying the process", refers to the fact that the steps of the method according to the invention, such as the determining of the process data and/or of the correlation, during the entire process and/or during all sub-processes and/or during the actual film production and/or further processing and/or real-world conditions, are carried out in the, particularly productive, operation. In particular, here the film production and/or the further processing are meant, that is in particular the sub-processes, the actual (production) processes, and therefore not only trial processes or laboratory tests.

In particular, within the scope of the invention, it might be of advantageous effect, if e.g. even only within a certain sub-process (such as the film production or the further processing), the process data determined therein are used, in order to control and/or to adapt and/or to optimize the sub-process parameters of this particular sub-process. For example, in the first sub-process, a sub-process parameter of a second production device can be adapted in that first production process data of a first production device, which is located upstream of the second production device, are assessed. In the same way, a sub-process parameter of a second further processing device can, e.g. in the second sub-process, thereby be adapted, in that first further processing data of a first further processing device, which is located upstream of the second further processing device, are assessed. Herein, the term process parameters, refers to e.g. controllable functional parameters of the devices in the respective sub-process, which process parameters, e.g. can also be preset in a simplified manner, by means of a formula (e.g. film formula), for the device.

According to an advantageous further development of the invention, it can be provided that, in the data transmission, the production process data are provided, product-related and/or order-related, for a respective product of the film production and/or further processing, and/or are permanently stored, wherein, preferably, the product-related and/or order-related production process data are transmitted, via a communication- and/or internet connection, to a central processing device, wherein preferably at least one of the following steps is provided, wherein the steps are preferably carried out subsequently or in any desired order:
  selecting the production process data relevant for the further processing, and/or of the correlation, and/or of the evaluation result, so that a selection is determined,
  providing the selection for the further processing,
  adapting the further processing based on the selection.

The advantage can hereby be achieved that the further processing can be optimized based on the process data from the film production. The product is configured for e.g. as a sub-process product, such as e.g. a film roll as a result of the film production. In particular, the life cycle of the film roll from order to use can thus be correlated, and different data can thus be brought in correlation with one another.

Preferably, the production process data include at least one of the following information:
  a measure for the relative orientation of the film,
  the film thickness,
  the run length,
  a winding characteristic,
  a measure for the stiffness and/or elasticity of the film, e.g. via an e-modulus
  a measure for the number and/or size of imperfections in the film, e.g. via digital image processing, e.g. for detecting fish eyes,
  a measure for the relative crystallinity of the film,
  the thickness and/or thickness distribution of functional individual layers within the film, in particular in an edge region of the film,
  a measure for the hardness of the film roll or of the wrapped-in air, in particular over the entire diameter,
  a film width,
  a roller weight
  a density of the film,
  a roller diameter,
  a geometry of the winding tube,
  information about the cooling down, in particular the course of cooling down of the film,
  a marking, in particular for the film product and/or order and/or for the formula,
  a security marking, which comprises a marking, protected against forgery, of the product, in particular to ensure the product protection, which preferably indicates the authenticity.

Preferably, the production process data also include values and/or value ranges for real-world and/or maximum allowable discrepancies for at least some of this information of the production process data. In particular, the production process data can further include quality data of the film. The product-related providing occurs preferably in such a manner that a unique identifier is generated for the respective product, which makes a unique assignment (e.g. of the production process data) to the product possible, which e.g. was produced according to the production process data. The measure for the relative orientation and/or the crystallinity of the film can here include information about a deformation behavior and/or an optical property of the film. In particular, through the security marking, a rights management can further be enabled, so that additionally to the counterfeit-protection, a differentiated assignment of rights for different stakeholders is also possible. The identifier can thus make an accessing of a central processing device, which administers an assignment of rights, possible.

It can also be preferably provided, that a security marking is reviewed in the further processing and/or through the further processing device. It is in particular possible, that, through the security marking, the authenticity of the product, e.g. of the film, is clearly established/confirmed to ensure the product security. To that end, it can in particular be possible that the security marking is determined by and/or on the production device, in particular as production process data, and/or is provided via the data transmission. In particular, the security marking can be product-relatedly attached to the product, as well as being provided for the further processing via the data transmission. In the further processing, e.g. the product-related security marking can thus be compared with the provided security marking. It is also conceivable that no attachment of the security marking must occur, and the provided security marking is formed, e.g. based on product-specific features of the produced product, e.g. of the film, such as e.g. based on the production process data. It can also be possible that the security marking is protected against forgery, or forgery-proof, respectively, e.g. through a coding, wherein, a secret key is necessary in particular for the decryption, which key is e.g. comprised by the further processing device and/or the processing device.

It is further conceivable, that the data transmission occurs as an automated data exchange, wherein the data exchange is carried out in such a manner that the production process data are at least partially transmitted to the further processing device, and the further processing process data in particular are at least partially transmitted to the production device, preferably via a communication- and/or internet connection. In other words, it can be provided that the data transmission can be carried out as a data exchange between the production device and the further processing device. The data exchange can e.g. occur directly (i.e. in particular via a direct communication, such as via mobile radio), or occur indirectly (e.g. via a network and/or a central processing device). In particular, the data exchange here can occur automatedly, e.g. in the background, in order to provide e.g. a reliable and quick optimization of the process.

It can preferably be possible that one or multiple devices are provided in a first sub-process of the process, e.g. of the film production, and in a second sub-process of the process, e.g. of the further processing. The devices here are for e.g. the (first and/or second and/or further) production device(s), and/or the (or first and/or second and/or further) processing device(s). It is thus advantageously possible that, also in complicated and complex processes, an optimization can occur, e.g. based on the correlation.

It is further conceivable that, for the (e.g. wireless) data transmission from a (first) further processing device to a production device (and/or a second further processing device), a selecting of the production device (and/or of the second further processing device) occurs through the (first) further processing device, e.g. through the selecting of a device-specific marking, such as a mobile telephone number, which is specified e.g. via a SIM (subscriber identity module) of the device. This enables a reliable data transmission, in particular in an automated manner in the background, i.e. without the involvement of an operator and/or of a person, for example.

Further, it can be provided in the scope of the invention that the data transmission is carried out in such a manner that the production process data and/or the further processing process data are at least partially transmitted to a central processing device, e.g. to a network- and/or internet server, preferably via a communication- and/or internet connection, wherein, particularly preferably, the processing device subsequently determines the correlation, and/or makes the transmitted production- and/or further processing process data and/or the correlation available for further assessment, via the communication- and/or internet connection, in particular via an webpage and/or an application operable via a network. The advantage is hereby achieved that the information for the optimization of the process, e.g. the evaluation result or the process data, can be simply and cost-effectively be provided, and can flexibly (e.g. in the film production, as well as also in the further processing) be retrieved and used. In particular, it can be provided, that exclusively the processing device determines the correlation. This can be provided e.g. thereby in that the production process data and/or further processing process data are transmitted in an encrypted manner, and (e.g. exclusively) the processing device comprises the key information for the decrypting.

In addition, it is conceivable, in the scope of the invention, that the data transmission occurs based on an identifier permanently assigned to the production process data and/or further processing process data, in particular based on a machine-readable and/or QR-code, which advantageously is attached to a product (i.e. in particular an overall- or sub-process product) of the process. In particular, the securing occurs on a film roll. In particular, the identifier comprises a code, which enables the assignment to the production process data. As the identifier is advantageously attached to the (sub-process) product of the film production, and thus, for e.g., to the film, the further processing process data determined here can, in the further processing with this product (e.g. of the film), be assigned, in a simple manner, to the associated production process data. For e.g., the code is transmitted to a central processing device to that end, for e.g. together with the determined further processing process data, so that, based on the assignment, or based on the code, the correlation with the associated production process data can be determined. It is also conceivable that the code serves as decrypting information for decrypting the production process data and/or further processing process data. Here, the identifier can be attached in particular manually or in an automated manner. In the manual attaching, acquisition costs for necessary equipment can be reduced, while in an automated securing, a process security can be increased.

Moreover, it can be possible that, via at least one identifier, an individual identification of specified processing- and or film parameters, such as e.g. the individual uses via the film width, can be carried out. The process data can then be transmitted and/or assessed and/or correlated e.g. depending upon these processing- and/or film parameters. In addition, in particular the identifier can also be used for the further processing, in order to control e.g. the further processing based on the processing- and/or film parameters. The advantage is hereby achieved that the identifier can be employed for a plurality of tasks and/or to optimize the further processing. Here, the identifier can preferably be read-out manually or in an automated manner. As already disclosed with respect to the attaching, acquisition costs can, in a manual selection, be reduced for required equipment, while, in an automated read-out, a process security can be increased.

It is further also conceivable that, after the data transmission, e.g. of the production process data to the further processing device, the further processing is initiated, and/or the determining of the further processing process data occurs, wherein, in particular the determined further processing process data are likewise permanently assigned to the identifier, and/or are transmitted to a central processing device. In particular, here the further processing is as least partially adapted based on the production process data. This has the advantage that the further processing, through the data exchange, can be adapted simply and reliably to the particularities of a certain produced product. These specificities, e.g. in the produced film, are here caused automatically, e.g. by the film production. Discrepancies and/or material variations can thus result, in the film production, which discrepancies and/or material variations affect the product, and thus the entire process. The term "permanently" refers in particular to the fact that the information is persistent, and e.g. is not present in a transitory data storage unit. Here, the term product, in particular refers to an intermediate product, e.g. of the first sub-process.

Advantageously, it can be provided in the invention that the data transmission occurs during the film production and/or further processing, in particular accompanying the process in the background, preferably cyclically and/or event-triggered, between one or multiple further processing devices and/or one or multiple production devices.

Preferably, an optimization can thus, accompanying the process—in particular while the further processing with the film occurs, that is e.g. a product results and/or is processed (e.g. printed-on on or arranged)—occur, and/or a storing, and/or a transmission, and/or an assessment, and/or a correlation of the process data can occur. It is conceivable that this occurs cyclically during the entire (sub-) process and/or triggered in the case of certain events. In particular, a confirmation on behalf of the user can be required prior to the data transmission. In particular, the data transmission can occur after the film production. The data transmission can thus be provided for a point in time during a process, at which a film roll is completed as result of the film production, wherein e.g. sufficient ready-to-sell film is wound around a winding tube of the film roll. Further, an exchange of a winding tube can preferably be provided before or after the data transmission.

Moreover, it is conceivable that the (or a single) process, in particular each sub-process and/or the film production and/or the further processing (of the same process) includes one or multiple production- and/or further processing devices, wherein, on the respective production- and/or further processing devices, respectively-assigned production and/or further processing process data are determined, wherein, accompanying the process (e.g. within the same process), one or multiple correlations are determined for in each case different data of the respectively assigned production- and/or further processing process data, so that the film production and/or further processing in particular, based on the correlation, can be controlled and/or adapted, in particular accompanying the process and/or in the background. This has the advantage that, when using multiple devices, e.g. further processing devices in the further processing with the film, multiple process steps can also each individually be optimized. In particular, the results (e.g. the first determined correlation or a first evaluation result) of a first device can be used to optimize the downstream-located process steps, e.g. one of the second device located downstream of the first device. Further, it is advantageously conceivable here, that process limits and/or parameter limits are determined and/or adapted for the production and/or further processing process data.

Preferably, a device, e.g. the at least one production device and/or the at least one further processing device, is a machine (of the process) and/or an industrial robot, which works directly and immediately on the product, e.g. with direct contact to the film. The at least one production device and/or the at least one further processing device thus has, accompanying the process, i.e. while the process is conducted, for e.g. direct contact to the film and/or to the product, so that here, a processing occurs directly on the film. The device thus includes in particular no control device, which is configured separately from the actual device, e.g. a separate computer (e.g. for controlling and/or monitoring the process).

It can further be possible that the evaluation result comprises at least one of the following information, which preferably will be assigned to at least one device (e.g. the production- and/or further processing device) of the process, and/or will be determined from the production process data and/or the further processing process data:

- at least one performance metric of the at least one device of the process, in particular of the production device and/or of the further processing device, in particular a material metric and/or a product metric and/or a process metric,
- at least one indication about (e.g. necessary) maintenance (the indication to the maintenance may be derived from a comparison of process data, and/or correlations, and/or evaluation results, in particular with suitable references, such as the history of the machine or comparable machines),
- at least one processing speed,
- at least one mechanical and/or optical property of the film,
- at least one film formula for the film production and/or further processing,
- at least one range of variability of the forces and/or moments in the film production and/or further processing,
- indications and/or parameters and/or optimization proposals for the further processing and/or the film production,
- at least one indication about the quality of the product, in particular the consistency of particular product properties,
- at least one indication about the quality of the process, in particular the constancy or the range of variability of certain parameters,
- at least one indication about product parameters, such as roll- and/or tube dimensions, weights, thicknesses and/or other product provisions,
- information about one of the process modules located upstream of the film production and/or a raw material of the further processing and/or the film production,
- at least one indication to adapt a process window,
- at least one indication about the fusing behavior of individual specific raw materials of a formula in an extruder, in particular with regard to a statement about the selection, quality, and/or consistency of the raw material used, wherein the evaluation result is at least partially provided to a film manufacturer and/or a film further processor, in particular via a network, preferably through an internet platform. The optimization proposals can here include e.g. information, which are displayed to a film further processor, and/or include information, which is implemented in an automated manner and/or in the background, e.g. through the (first or second or another) further processing device and/or production device. The internet platform is e.g. a webpage or an application, which is operated via a network and/or via the internet. This enables a particularly simple ensuring of the quality. The process window here can receive information about process limits or parameter limits, which for example can hereby be adapted with regard to a quality requirement, or can be designed to make an affordable production process possible.

It can further be provided that, based on the evaluation result and/or on the correlation, a process module located upstream of the film production is evaluated. Alternatively or additionally, it is conceivable that, based on the correlation and/or based on the evaluation result, a raw material is identified and/or judged. The raw material is used for e.g. in the further processing and/or the film production, e.g. in an extruder, in order to produce in particular an (end) product of the film production and/or further processing. In particular, an upstream-located process module of the process chain, e.g. of the reactor, can thus be judged and or evaluated. To that end, in particular production process data are taken into account, and/or compared with the result of the film production, e.g. automated and/or in the correlation.

To that end, a data exchange can also be provided between the upstream process, e.g. with the reactor, and the film production and/or the further processing, for example.

According to a further advantage, it can be provided that the production process data and/or the further processing process data include at least one of the following information, which are preferably determined through a sensor (e.g. of one of the devices), in the device of the process:

at least one indication about a correlation between stress and strain, such as for example a stress-strain curve of the film, at least one indication about unwinding forces in the film, a number and/or type of disruptions in the further processing, such as e.g. a number of the film tears in the further processing, a number and/or a type of a product of the further processing, or of a further process, in particular of a packaged pallet, a measured force value, and/or a torque in the device, a temperature value, which was detected in the device, a film formula for the film production and/or further processing, optical and/or acoustic information, which were detected in particular in the device, Errors or warnings, in particular error messages of the device and/or data transmission errors, a number of occurred further processing steps with the film, e.g. number of packaged pallets, and/or produced print patterns, and/or produced packaging units, information from data of a modelling, number of the products generated and packaged, in particular error-free, per film roll, Information about local wall thicknesses or wall thickness changes in a deformation process of the film.

A recipe and/or a film formula here includes, for example specifications and settings for raw materials and/or single-layer thicknesses of the film and/or process parameters, in particular for certain devices of the process. In particular, it is conceivable that the production process data and/or the further processing process data also include further information, in particular about process parameters monitored on the devices. Here, it can also be provided that the range of the production process data and/or of the further processing process data, that is, the type and number of the information present therein, can be set and/or pre-defined and/or changed. This enables a flexible adaptation to various processes.

In particular, the production process data and/or the further processing process data can advantageously include at least one of the following information about a process event, which are preferably determined through at least one sensor, in the device of the process:

point in time of the occurring of the process event status of a film roll, in particular at the point in time of the process event.

Here, under the status of the film roll, in particular a situation in relation to the film roll can be understood. The status of the film roll can thus include, for example a running meter of the film roll and/or a particularly current diameter of the film roll. It can thereby be determined or ascertained, how much length of the film, up until the arising of the process event, was already wound onto the roll, or was unwound from the roll. Here, a process event can preferably be a disruption, such as e.g. an unsuccessful opening of a tubular film, a film tear, or a breaking of a sack formed from the film. Through providing of an information regarding the position and/or time of the process event, the production process can be optimized in a targeted manner, if it is determined that the process event repeats itself after a certain time in the process, or a certain place on the film roll. The process event can, however, also be the subsequent event of a further process event. Here, from the subsequent event, the process event can preferably be concluded. Thus, it can be recognized, for example through a camera or further sensors, that a part of a print image is missing, an initial pull-in comprises a changed slip, or changed forces and/or moments arise in the process. A characteristic process event can, in turn, be concluded therefrom.

It can in particular be provided, that the product and/or the (e.g. produced) film is configured as at least one of the following:

a flat film, and/or a blown film, or cast film or blown film, and/or a film with major polyethylene components, e.g. LLDPE (linear low-density polyethylene), LDPE (low-density polyethylene), or HDPE (high-density polyethylene) types, and/or a film with major components of polypropylene, and/or a laminator foil, and/or a lining foil, and/or a barrier film, and/or a shrink-film, and/or a stretch hood film, and/or a FFS film, and/or a surface protection film, and/or a deep-drawing film, and/or a bag film, and/or a printed film, and/or a metallized film, and/or a stretch film.

Alternatively or additionally, it is conceivable that the further processing process data are determined, through a detecting of at least one of the following process parameters, on the at least one production device and/or further processing device, in particular through a sensor of the respective production device and/or further processing device:

mechanical properties of the film, wherein preferably the film is configured as a stretch film, in particular as a stretch hood, collation shrink, stretch-hood, shrink-hood, or stretch-wrapping film, friction values of the film, wherein film is preferably configured as an FFS film, deformation forces and/or curvature and/or remaining wall thickness of the film, wherein the film is preferably configured as a deep-drawing film, Parameter of an e-modulus (modulus of elasticity) and/or defects of the film and/or winding parameters and/or unwinding forces and/or curvature, wherein the film is preferably configured as a printed film, Winding parameters and/or unwinding forces and/or curvature of the film, wherein the film is advantageously configured as a metalizing foil and laminator foil or lining foil, the sealing performance of the film used, like the set SIT (Sealing Initiation Temperature) or sealing period in processes with heat sealing or ultrasound parameters in processes with ultrasonic sealing.

The advantage is hereby achieved that, through taking into consideration the evaluation and/or correlation of this information in the process, a sufficient process stability can be ensured, or the process or the product or the underlying model can be optimized or further developed. Herein, the term remaining wall thickness, refers to a residual wall thickness, after the film was deep-drawn in a further processing. Here, the remaining wall thickness can preferably be viewed at edges or corners.

It can be provided that the one or multiple further processing process data are determined on a single further processing device, which data can in particular be configured differently, e.g. with respect to the type of the information (e.g. the process parameters), which are represented through the further processing process data. Alternatively or additionally, it can be possible that the further processing process data, e.g. with information about the unwinding of the roll (e.g. web tension over time), are assessed from the further processing device (such as a metallizer), during the further processing (accompanying the process). In particular, the assessment occurs iteratively through the determination of a correlation with production process data and/or further processing process data, e.g. from a winding process (of the production device). From this correlation, e.g. an anti-block- and/or powdering metering in the film production, and/or an evaluation result can be determined and in particular used in order to adapt to the winding tension. The evaluation result can for example also be determined based on the correlation and/or a constancy and amount of an anti-blocking metering, in the further processing.

It is also optionally conceivable that the evaluation criterion comprises a formula, in particular a film formula, and/or a film-related specification, preferably with predefined film properties, and/or at least one manufacturing parameter of the production device, and/or a specification of the further processing device for the film. Thus, it is for example conceivable, that film properties and/or quality characteristics (e.g. before a further processing) can be hereby predefined in a targeted manner. The film from the film production which is used for further processing can be optimally specified, e.g. based on the determined production process data.

Further, it is optionally provided that the correlation is determined based on at least one process model, wherein preferably a trainable and/or predictive assessment of the production process data and/or of the further processing process data is carried out. In particular, the correlation can be carried out in such a manner that, based on newly established further processing process data, the determination of the correlation and/or an assessment, e.g. an analysis, is improved. Predictions can hereby be made, e.g. based on given determined production process data, e.g. through the assessment, how the production process data affect the further processing. Based on this prediction, e.g. at least one optimization suggest can then be defined for the further processing. In particular, the process model and/or further process models can, through a process model processing, thereby be created and/or calibrated and/or further developed, in that upstream-located and/or (process) accompanying and/or downstream-located specific testing methods and/or laboratory assessments are carried out. In particular, the further processing process data are redundantly and/or complementarily or alternatively used here, in order to carry out the process model processing, i.e. the creating and/or calibrating and/or further developing of the process model.

In a further possibility, it can be provided that, in a selection of further production process data, which are determined for a film associated with the further production process data, an expected result of the further processing of the assigned film, and/or an estimated behavior of the assigned film in the further processing is predicted, predictively depending upon these further production process data, based on at least one previously determined correlation. The further production process data here are e.g. one or multiple process data, which were previously already determined, wherein, for the product assigned to these further production process data, e.g. a further processing was already carried out, and/or a correlation, based on the thereby-determined further processing process data, was already determined. In particular, a "historical" databased can thus be used, in order to already predict future results, based on the determined production process data, prior to the further processing. In this manner, e.g. an optimization suggestion can also then be established, and/or the suitability for certain application classes or categories can be predicted. Thus, the film can be employed, for e.g. in a very fast running application, e.g. a high speed wrapper, and, e.g. depending upon the number of fish eyes determined in the production process (film production), an accumulation of impermissible film tears can be determined. In particular, a new limit for this application can then be defined, when such an accumulation or the like is ascertained, and/or the produced product can then be supplied to an application running at lower speed. The optimization suggestion thus includes e.g. also an information for the process optimization, such as a process change due to an ascertained condition (such as the accumulation of the film tears), based on the correlation.

It can further be provided that, based on the determined correlation for first production process data and/or first further processing process data, a prediction about a predicted event, in particular about predicted further processing process data, of the further processing is carried out, in particular depending upon further determined production process data, wherein preferably, the evaluation result includes the predicted result. Thus, a further improvement of the process is possible.

According to an advantageous further development of the invention, it can be provided that the correlation is determined in that an assessment of the determined production process data and the determined further processing process data occurs
- through the further processing device, and/or
- through the production device, and/or
- through a central processing device, in particular through an ERP (Enterprise Resource Planning) system and/or through a network and/or internet server.

The evaluation here serves in particular to provided different functions, in particular to continuously ensure quality, and/or optimization of the process, and/or optimization of the product, and/or monitoring of the performance, and/or determining of error causes, and/or testing for forgery, and/or a diagnosis function, and/or to optimize a process default, which is specific in particular for the process of the film production and further processing. These functions can here be provided preferably through an application, such as an internet application and/or the process default and/or the ERP system.

According to a further advantage, it can be provided that the correlation is thereby determined, in that a statistical assessment, preferably a regression analysis, is carried out, wherein the regression function is estimated based on the determined production process data and/or the further processing process data. This can e.g. be effected such, in that a non-parametric regression method, such as a Kernel regression and/or multivariate adaptive regression splines and/or the like is carried out. Alternatively or additionally, it is conceivable that a method, such as the method of the least squares or the maximum likelihood method or the like, is carried out. In particular, the assessment can also be improved, in that upstream-located and/or accompanying and/or downstream-located specific test methods and/or laboratory assessments are carried out, and or the further processing process data are used accompanying the process and/or complementarily and/or redundantly and/or alternatively. Further, it is conceivable that alternatively or additionally, a linear regression and/or a semi-parametric regression and/or a robust regression are carried out. E.g. a very reliable prediction about expected results of the further processing, based on provided production process data, can thereby also occur.

It can further be possible that the correlation is thereby determined, in that a pattern recognition is carried out, preferably through a syntactic and/or statistical and/or structural pattern recognition, wherein preferably the following steps, which are preferably carried out one after the other, are provided, in particular in order to carry out the pattern recognition:

pre-processing of the determined production process data and/or further processing process data, in particular through signal processing, in particular filtering, preferably in such a way, that a noise and/or outliers of the (process) data are reduced, obtaining of features and/or reducing of features, in particular through a transformation and/or through a variance analysis, classification of the features, in particular in classes, wherein preferably the evaluation criterion defines the classes.

The pattern recognition is carried out for e.g. through a processing device, in particular through a processor and/or digital signal processor of the processing device, in order to provide a reliable and quick correlation. Particularly advantageously, the correlation can also be used for the optimization and further development of a process parameter and/or product on the production- and/or further processing machine. On the production side, for example a targeted reduction of the production costs (without affecting the further processing), and/or a targeted optimization of selected product properties, and or the introduction of particular internal processing- or quality measures due to the feedback of the further processing can thereby be undertaken, e.g. through the continuous feedback from the further processing, in that product parameters and/or process parameters are adapted depending upon the feedback. On the further processing side, it is e.g. possible to undertake an optimization of the overall product properties while balancing out the properties for the film product and the properties for the further processing.

Likewise subject-matter of the invention is a system for evaluating at least one industrial process for the film production of a film, in particular a stretch film or the like, and/or further processing with the film, including:

at least one production device for the film production of the film, at least one further processing device for the further processing with the film.

It is thereby particularly provided that, for a data transmission, a transmission system is connected to the production device and the further processing device (e.g. electrically, in particular via radio and/or via electrical lines), so that production process data from the production device, and further processing process data from the further processing device can be provided and/or, for determining correlation, are assessable, wherein, based on the (determined) correlation, an evaluation result can be established. The system according to the invention therefore comes with the same advantages, as have been described in detail with respect to a method according to the invention. In addition, the system according to the invention can be suitable to be operable according to a method according to the invention.

Moreover, it is conceivable that the production device is formed as a film machine, and/or as a polymer reactor, and/or as a film extrusion machine, and or as a blown film machine, and/or as a cast film machine, and/or as a flat film machine. Alternatively or additionally, it is provided that the further processing device is formed as at least one of the following film processing devices:

a stretch-wrapping machine,
a stretch hood,
a bagging machine, preferably form, fill & seal (FFS) bagging machine,
a deep-drawing machine,
a printing machine,
a metallizer,
a rewinding machine, which e.g. comprises an unwinder and/or a winder,
a film machine,
a laminator machine,
a lining machine,
a coating machine,
a shrink hood machine,
a shrink tunnel,
testing device,
shrink packaging machine.

Thus, in the further processing, i.e. in particular on the application side, e.g. a stretch-wrapping of pallets occurs to obtain cargo securing. In particular, here the correlation and/or the evaluation result and/or an optimization proposal serve to optimally utilize the properties of the respective film (of the respective film production), to increase the process security, and/or to reduce the number of film tears.

It can be of advantage if, in the scope of the invention, at least two or three or more further processing devices are provided, wherein the further processing process data can be determined on each of the further processing devices, wherein the respective (determined) further processing process data are permanently assignable to the respective production process data, in particular based on a higher-order identifier. Thus, it can e.g. be provided that, in the further processing, a product of the film production with an identifier is further processed. Based on the (first) identifier, e.g. the associated product-related and/or order-related (first) production process data can then be selected and/or, based on this production process data, the further processing can be optimized. The product is then processed, for e.g. for the further processing of a first further processing device, wherein here, first further processing process data are determined and, in particular, assigned to the (first) identifier. The processed product is subsequently further processed, for e.g. by a second (located downstream of the first) further processing device, wherein here second further processing process data are determined and are assigned in particular to the (first) identifier. In particular, after further process steps on the further processed product, the end product of the further processing resulting therefrom will likewise be assigned to the (first) identifier, in order to be able to assign e.g. errors on the final product to the production process data. In particular, in new process sequences with other products, an assignment to respectively different identifiers respectively occurs.

It can in particular be provided for that the same film products are processed on same and/or similar comparable and/or different further processing machines, and/or new optimization proposals are generated for the process through the comparison of the feedback of these processing machines. For example, technical details can thus be collected and/or compared and/or assessed for comparable further processing machines, in order to thus optimize the use of the machines.

Preferably, it can be provided in the scope of the invention that the production device and/or the further processing device comprises at least one interface device to connect with the transmission system, in particular to a network, wherein the interface device preferably includes a network interface and/or a mobile radio interface and/or a WLAN (wireless LAN) interface and/or a Bluetooth interface and/or a RFID (radio-frequency identification) interface. In particular, a point-to-point connection is produced, between a first device (e.g. the production device and/or a first further processing device) and a second device (e.g. the first and/or second further processing device), for data transmission. It is also conceivable that, via the interface, an external device can gain access to the determined process data and/or evaluation results and/or correlations. A versatile assessment and data acquisition can thus occur, in order to further optimize the process.

Further, it is conceivable that the production device and/or the further processing device includes a read-in device, in order to read-in an identifier of a product of the process, wherein the read-in device is preferably configured as a barcode scanner or a QR-Code scanner or as a RFID sensor or as a NFC (Near Field Communication) sensor. Alternatively or additionally, it is provided that a first identifier for a first product of the (film) production in a first process differs from a second identifier for a second product of the (film) production in a second process, wherein the respective identifier remains the same within the same process for the (film) production and/or further processing. In particular, the identifier thus makes a unique assignment to an certain individual process (sequence) with a certain specific product (e.g. an certain film) possible. A reliable assignment and adaptation can thus occur, based on the production process data, for the further processing.

For example, it can be provided that at least first production process data are determined at a first production device, and at least second production process data are determined at a second production device, wherein the data transmission, for the providing of the first and/or second production process data is carried out, between the first production device and the second production device, in order to determine in particular a first correlation. In particular, the same indicator (e.g. the same code) is provided for the first, as well as also for the second production process data, in order to make a reliable assignment possible.

Moreover, it can provided that at least first further processing process data are determined on a first further processing device, and at least second further processing process data are determined to a second further processing device, wherein the data transmission for providing the first and/or second further processing process data is carried out, between the first further processing device and the second processing device, in order to determine a second correlation, in particular. Thus, it can in particular be provided that correlations are determined between different further processing process data and/or between different production process data and/or between different production process- and further processing process data. In particular, the correlations are determined accompanying the process, i.e. in particular only determined for such process data, which belong to the same process (that is, have processed and/or produced and/or used a joint product, or intermediate products, dependent upon one another). Accompanying the process thus in particular refers to the fact that the individual intermediate products of the accompanying process respectively influence the final product of the process.

It can further be possible that the production device and/or the further processing device each comprise an interface device with a SIM card and/or an embedded SIM. Here, the embedded SIM in particular is built-in and/or is not exchangeable. This enables a simple and cost-effective construction of the device.

Likewise within the scope of the invention is a processing device, e.g. a network server, for evaluating at least one industrial process for film production of a film, and/or further processing with the film, including:
- an interface unit for connection with a transmission system. It is thereby in particular provided that, through a data transmission, at least production process data and/or further processing process data are transmittable, via the transmitting system, to the processing unit,
- an electronic processing unit, through which a correlation between the production process data and the further processing process data is determinable, wherein the processing unit is preferably configured as a microprocessor and/or digital signal processor,
- a non-volatile data storage unit for the permanent (persistent) storage of the correlation (i.e. in particular of the result of the determined correlation).

The processing device according to the invention thus comes with the same advantages, as had been described in detail with respect to a method according to the invention and/or a system according to the invention. In addition, the processing device can be suited to be operable according to a method according to the invention, and/or with a system according to the invention.

Furthermore, it can be of advantage, if the processing device, in particular the data storage unit comprises a, particularly encrypted, device-specific identifier, so that, through a comparison of the device-specific identifier with a counter-identifier of a respective device of the process, an authentication of the device can be carried out on the processing device, in particular in such a manner that, only in a positive authentication, a data connection and/or providing of the correlation and/or of the production process data and/or of the further processing process data occurs. In particular, the counter-identifier is provided here through e.g. a SIM (subscriber identity module). A reliable and secure operation of the process is thus possible.

It can further be provided in the scope of the invention that the processing device is configured as a central processing device, and in particular, is operable according to a method according to the invention, in such a manner that a data communication with at least one, or each of the devices of the system according to the invention can be carried out.

Likewise subject-matter of the invention is a computer program product for evaluating at least one industrial process for film production of a film, and/or further processing with the film. It is thereby provided that the computer program product is configured in such a manner that a method according to the invention is operable. The computer program product thus comes with the same advantages, as they had been described in detail with respect to a method according to the invention and/or a system according to the invention and/or a processing device according to the invention.

In a further option, it can be provided that the computer program product is configured as an ERP system and/or as an internet- and/or network-based platform, and/or as firmware or control software for at least one device of the process, and/or as an internet application and/or as an webpage, and/or as an application operable via a network. Cost-effective and flexible possibilities for optimization of the process hereby result. The computer program product here is in particular configured in such a way that different operators and/or users of production and further processing machines can, with the help of the computer program product, achieve secure bi- and/or multilateral data exchange with different permission levels. The computer program preferably allows the use of pre-fabricated correlation functions, as well as also the creation and further development of specific bi- and multilateral and/or proprietary correlations.

Figure 3:
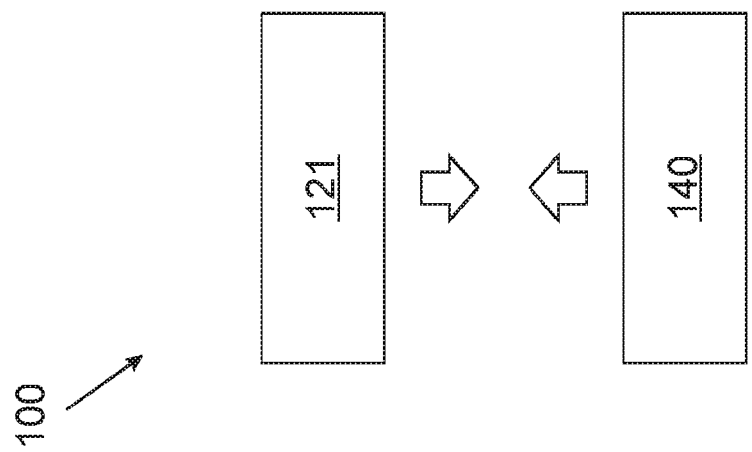
Figure 2:
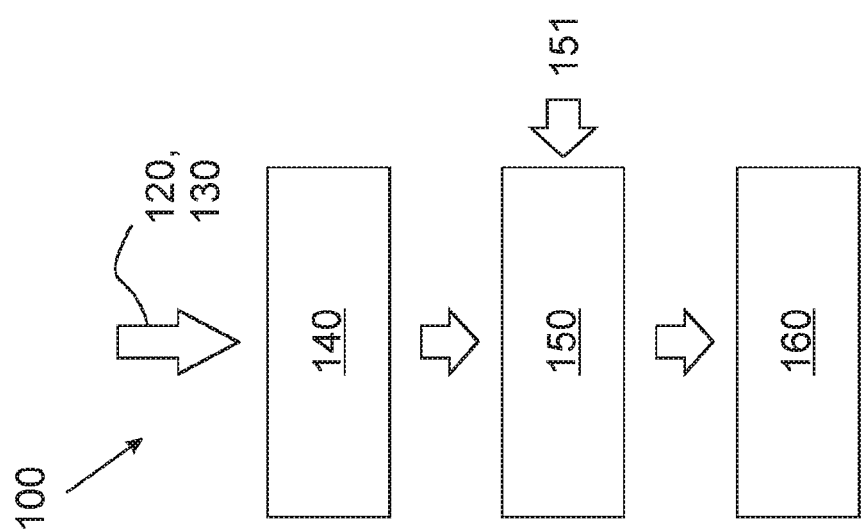
Figure 4:
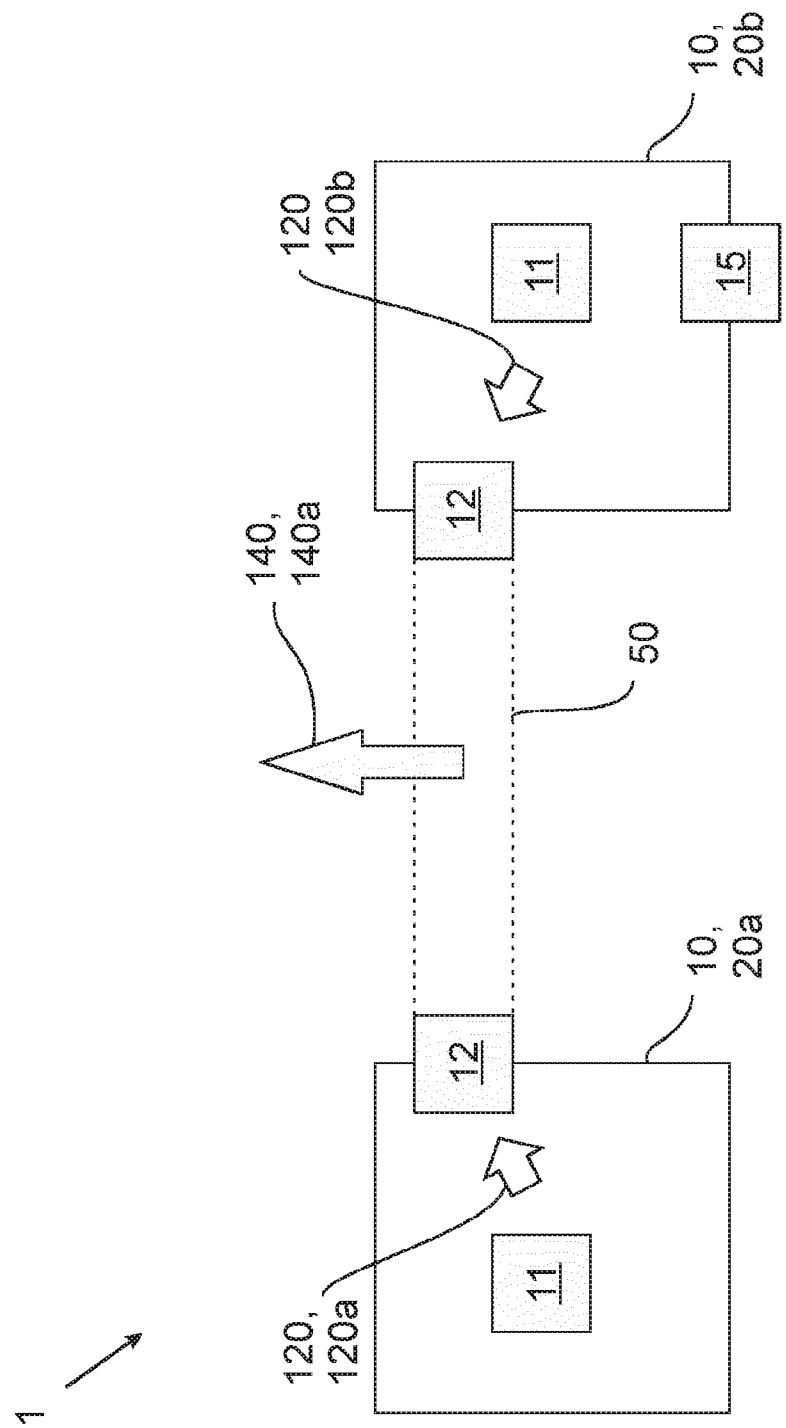
Figure 5:
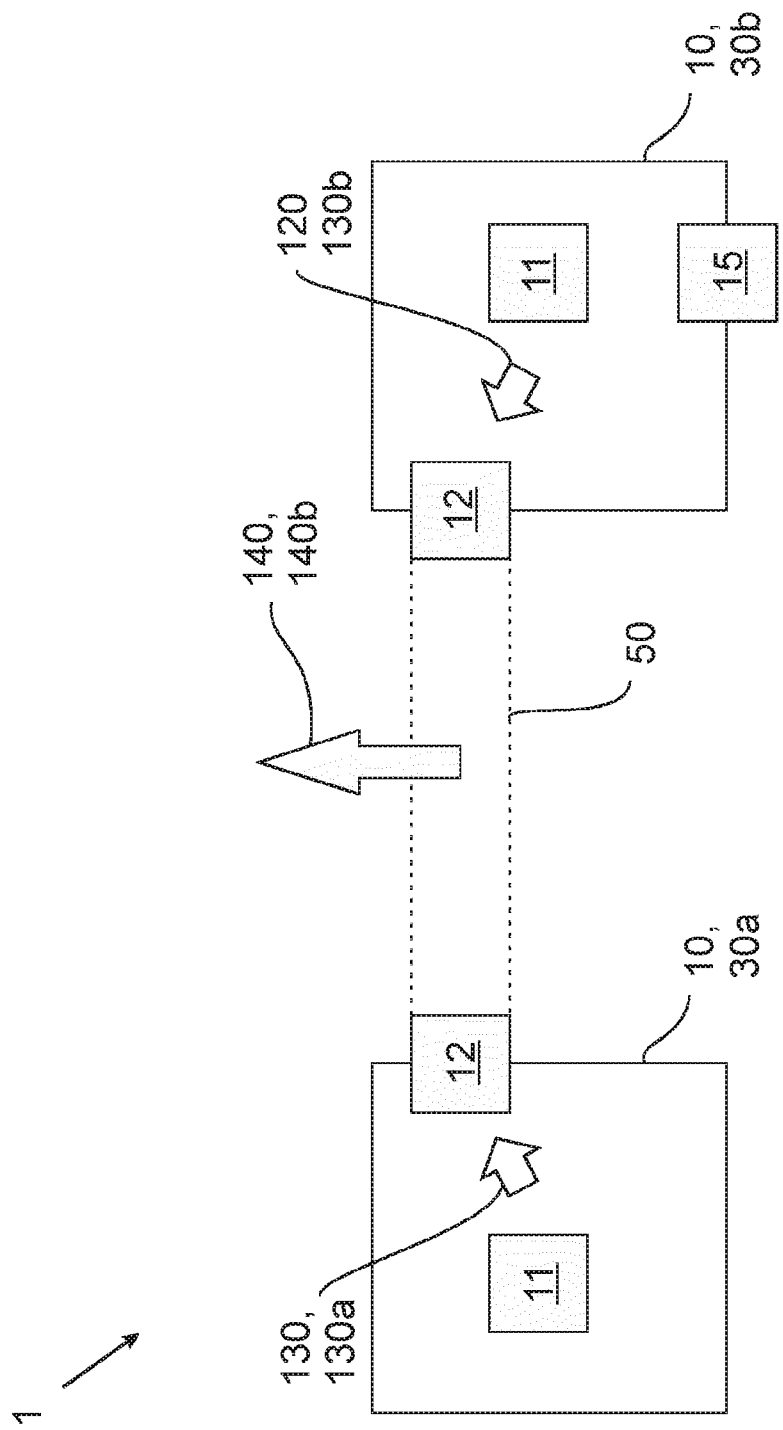

Further advantages, features and details of the invention result from the following description, in which, with reference to the drawings, exemplary embodiments of the invention are described in detail. The features referred to in the claims and in the description can here respectively be essential to the invention each individually, or in any desired combination. The Figures show in:

FIG. 1 a schematic representation of a system according to the invention,

FIG. 2 a schematic representation for visualizing a method according to the invention, FIG. 3 a further schematic representation for visualizing a method according to the invention, FIG. 4 a further schematic representation of a system according to the invention, FIG. 5 a further schematic representation of a system according to the invention.

In the figures below, the identical reference characters are used for the same technical features of different exemplary embodiments as well.

FIG. 1 schematically shows a system 1 according to the invention, which serves to evaluate at least one industrial process for film production of a film, and/or further processing with the film. The system 1 according to the invention and/or the entire process here include one or multiple production devices 20, and/or one or multiple further processing devices 30. It is thus represented, for example, in FIG. 4 that a first sub-process of the overall process can include a first production device 20a and a second production device 20b for the film production. Likewise, a second sub-process of the overall process can comprise a first further processing device 30a and a second further processing device 30b for the further processing. The first sub-process here includes e.g. the production of one or multiple films through the at least one production device 20, and the second sub-process includes e.g. the further processing of these films through the at least one further processing device 30. Here, it can be provided that initially a production of e.g. multiple films occurs, wherein, for the further processing, only certain films are selected and used for further processing.

FIG. 1 further illustrates that the production- and/or further processing devices 20, 30 can respectively be configured as a device 10 according to the invention. In other words, each of the production- and/or further processing devices 20, 30 can, for example, comprise an interface device 12, and/or one or multiple sensor(s) 11, and/or a read-in device 15.

In the production, production process data 120, e.g. through the detection of at least one process parameter on the at least one production device 20, are determined, in particular through the sensor 11 of the respective production device 20.

In the further processing, further processing process data 130 are determined, in particular through a detection of at least one process parameter on the at least one further processing device 30, preferably through a sensor 11 of the respective further processing device 30.

The determined production- and further processing process data 120, 130 are subsequently provided, in particular via the interface device 12. To that end, the interface device 12 is connected e.g. with a transmission system 50, such as a network. In particular a data transmission of the determined production- and/or further processing process data 120, 130 occurs via the transmission system 50, wherein the data transmission can occur in at least one of the following data transmission types:

between the at least one device 10 of the film production and the at least one device 10 of the further processing, between various devices 10 of the film production, between various devices 10 of the further processing, between the at least one device 10 of the film production (i.e. the production device 20) and a central processing device 60, between the at least one device 10 of the further processing (i.e. the further processing device 30) and the central processing device 60.

The providing here primarily serves to be able to conduct a further assessment of the determined process data (i.e. of the production- and further processing process data 120, 130). The assessment can here be carried out in a processing device 60 according to the invention, which is arranged e.g. centrally and/or at the film production, and/or at the further processing. It is also conceivable that the processing device 60 is integrated into a production device 20 and/or a further processing device 30. The processing device 60 includes in particular an interface unit 61 for connecting with the transmission system 50, a data storage unit 63, for e.g. for storing the determined process data, and/or a processing unit 62, which can, e.g. as a microprocessor or the like, carry out arithmetic operations for carrying out the assessment and/or correlation. Further, the processing device 60 can comprise and/or execute a computer program product 200 according to the invention, which is suitable to carry out a method 100 according to the invention.

In the assessment, in particular the determining of a correlation 140 between the production process data 120 and the further processing process data 130 occurs, as shown in FIG. 2. Here, at least one evaluation criterion 151 is assessed, e.g. compared with the correlation 140, so that an evaluation result 150 is established. The evaluation criterion 151 is for e.g. a pre-defined value range, which specifies a target requirement. The correlation 140 is carried out for e.g. through numerical operations, e.g. through a regression analysis, wherein, in particular through the correlation 140, the further processing process data 130 are compared with the production process data 120. As a simple case of correlation and evaluation can e.g. serve a comparison of the further processing process data 130 with the target requirements, which are predetermined e.g. though the production process data 120. A further possibility of the correlation 140 is e.g. a pattern recognition and/or a use of neural networks, and/or a model fitting based on the further processing process data 130.

If the correlation 140 of the production process data 120 with the further processing process data 130 was already determined, this and/or the thereby resulting evaluation result 150 can thus be used, in order to carry out a prognosis for further (newly-determined) production process data 121. Thus, it is shown e.g. in FIG. 3 that, by means of the correlation 140, a prognosis and/or prediction of the results to be expected of the further processing can also occur, if the determined further production process data 121 are assessed (e.g. model-based) to that end. The basis for calculation used to that end, e.g. a model, is optimized and adapted, for e.g. through the correlation 140 of the production process data 120 and the (already previously determined) further processing process data 130. For example, it becomes possible to thereby predict, what kind of result of which is to be expected in the further processing, if the film of the film production, in which the further production process data 121 were determined, is used in the further processing.

The evaluation result 150 can subsequently be provided, e.g. in that it is integrated into an webpage, which is generated e.g. through the processing device 60 (as a server). A data transmission of the evaluation result 150, e.g. via the transmission system 50, can also be possible for providing.

The read-in device 15 shown in FIG. 1 in particular serves to read-in an identifier of a product of the process. Through the identifier, a clear assignment, in particular of the production process data 120 and/or of the further processing process data 130, to a product and/or result can occur, which was processed through the respective (sub) process. This enables, for example, a product-related and/or order-related providing, with the help of the identifier. In the data transmission, e.g. the production process data 120 can then be provided, product-related and/or order-related, for a respective product of the film production, and/or permanently stored. It can also be possible that, as a prerequisite for the providing of the further processing data 130 and/or of the evaluation result 150, the identifier must previously be transmitted to the processing device 60.

It is further conceivable that, initially in the film production, a certain (e.g. unique) identifier is allocated to the thereby-determined production process data 120, and the identifier and/or the production process data 120 are transmitted (provided) to the processing device 60. Further, the further processing with the film produced through the film production can occur e.g. temporally offset (in particular also after several days/weeks/months). In the further processing, the further processing process data 130 determined here can be transmitted to the processing device 60 for the providing, and/or, e.g. based on the identifier, an assignment of the determined further processing process data 130 to the corresponding production process data 120 can occur. It is also conceivable that the further processing is parameterized at least partially based on the identifier.

Preferably, the product-related and/or order-related production process data 120 can be transmitted to the central processing device 60 via the transmission system 50, in particular via a communication- and/or internet connection. In particular, a selection 160 of the production process data 120 relevant for the further processing occurs here, e.g. through a default, of which type of production process data 120 should be taken into consideration. This is schematically represented in FIG. 2, for example. It can further be possible that the selection 160 resulting therefrom is provided for the further processing, e.g. via a webpage, or at least as a downloadable file. The provided selection 160 can then, for example, be used in order to adapt the further processing, e.g. in order to adapt the parameter of the at least one further processing device 30.

It is further also conceivable that further correlations 140 are also determined. E.g. at least first production process data 120a can thus, as is shown in FIG. 4, be determined on a first production device 20a, and at least second production process data 120b can be determined on a second production device 20b. In particular, the data transmission can here be carried out to provide the first and/or second production process data 120a, 120b between the first production device 20a and the second production device 20b. Alternatively or additionally, the data transmission can also occur to a central processing device 60. Through a central processing device 60 and/or through further processing devices 60, which are integrated e.g. into the first and/or second production device 20a, 20b, a first correlation 140a can then be determined.

FIG. 5 illustrates that also at least first further processing process data 130a can be determined on a first further processing device 30a, and at least second further processing process data 130b can be determined on a second further processing device 30b. Here, the data transmission can be carried out to provide the first and/or second further processing process data 130a, 130b between the first further processing device 30a and the second further processing device 30b, and/or the central processing device 60, in particular in order to determine a second correlation 140b.

The first correlation 140a here makes e.g. an optimization and/or evaluation within the first sub-process possible, and the second correlation 140b makes in particular an optimization and/or evaluation within the second sub-process possible. It is possible here that this optimization occurs in an automated manner. E.g. the production of a first and/or second production device 20a, 20b can be optimized in that the first correlation 140a is assessed, and/or the processing of a first and/or second further processing device 30a, 30b can be optimized in that the second correlation 140b is assessed.

The above explanation of the embodiments describes the present invention exclusively within the scope of examples. Of course, individual features of the embodiments can, insofar as technically useful, be freely combined with one another, without departing from the scope of the present invention.

LIST OF REFERENCE CHARACTERS 1 system
10 device
11 sensor
12 interface device
15 read-in device
20 production device
20a first production device
20b second production device
30 further processing device
30a first further processing device
30b second further processing device
50 transmission system
60 processing device
61 interface unit
62 processing unit
63 data storage unit
100 method
120 production process data
120a first production process data 120b second production process data
121 further production process data
130 further processing process data
130a first further processing process data
130b second further processing process data
140 correlation
140a first correlation
140b second correlation
150 evaluation result
151 evaluation criterion
160 selection
200 computer program product

The invention claimed is:

1. A method for evaluating at least one industrial process for at least the film production of a plastic film or further processing with the film, with at least one production device, which is operated for the film production of the film, and at least one further processing device, which is operated for the further processing with the same film,
wherein the following steps are carried out accompanying the process:
determining production process data on the production device during the film production,
determining further processing process data on the further processing device during the further processing,
carrying out of data transmission for the provision of at least the production process data or of the further processing process data,
determining a correlation based on a process model configured to perform a predictive assessment between the production process data and the further processing process data, wherein at least one evaluation criterion is assessed, so that an evaluation result is established,
at least providing the evaluation result or the production process data or the further processing process data, and
adapting the further processing of the film by the at least one further processing device based on the evaluation result.

2. The method according to claim 1,
wherein
in the data transmission, the production process data are at least provided or are permanently stored, at least product-related or order-related, for a respective product of the film production, wherein optionally at least the product-related or order-related production process data are transmitted, via at least a communication- or internet connection, to a central processing device, wherein the following steps are optionally provided:
selecting the production process data relevant for at least the further processing, or the correlation, or the evaluation result, so that a selection is established,
providing the selection for the further processing, and
adapting the further processing based on the selection.

3. The method according to claim 1,
wherein
the data transmission occurs as an automated data exchange, wherein the data exchange is carried out in such a manner that the production process data are at least partially transmitted to the further processing device.

4. The method according to claim 1,
wherein
the data transmission is carried out in such a manner that at least the production process data or the further processing data are at least partially transmitted to a central processing device, optionally via at least a communication or internet connection, wherein, optionally, the central processing device subsequently determines the correlation or provides the transmitted production or further processing process data or the correlation, via the communication or internet connection, for further evaluation.

5. The method according to claim 1,
wherein
the data transmission occurs based on an identifier permanently assigned to at least the production process data or further processing process data, which is optionally secured to a product of the process.

6. The method according to claim 1,
wherein
the data transmission occurs at least during the film production or further processing, optionally at least cyclically or event-triggered, between at least one or multiple further processing devices or one or multiple production devices.

7. The method according to claim 1,
wherein
the process includes at least one or multiple production- or further processing devices, wherein, at least on the respective production or further processing devices, respectively assigned production or further processing process data are determined, wherein, accompanying the process, one or multiple correlations are determined for respectively different of at least the respectively assigned production or further processing process data.

8. The method according to claim 1,
wherein
the evaluation result comprises at least one of the subsequent information, at least which optionally is assigned to at least one device of the process, or which is determined from the production process data or the further processing process data:
at least one performance metric of the at least one device of the process,
at least one indication about maintenance work,
at least one processing speed,
at least one mechanical or optical property of the film,
at least one film formula for the film production or further processing,
at least one range of variability of the forces or moments in the film production or further processing,
indications or parameters or optimization proposals for the further processing or the film production, and
information about a process module located upstream of the film production or a raw material of the further processing or film production,
wherein the evaluation result is at least partially provided to a film manufacturer or a film further processor, optionally through an internet platform.

9. The method according to claim 1,
wherein
at least the production process data or the further processing process data include at least one of the following information, which optionally are determined via at least one sensor in a device of the process:
at least one indication about a conjunction between stress and strain in the film,
at least one indication about unwinding forces in the film,
a number of the film tears in the further processing, at least a number or a type of a product of the further processing, or of a further process,
at least a measured force value, or a torque in the device,
a temperature value, which was detected in the device,
a film formula for the film production or further processing,
at least optical or acoustic information,
errors or warnings, and
a number of occurred further processing steps with the film.

10. The method according to claim 1,
wherein
the further processing process data, through a detection of at least one of the following process parameters, are determined on the least one further processing device:
mechanical properties of the film, wherein optionally the film is configured as a stretch film,
friction values of the film, wherein optionally the film is configured as an FFS film,
at least deformation forces or curvature of the film, wherein the film is optionally configured as a deep-drawing film,
at least parameter of a modulus of elasticity or defects of the film or winding parameters or unwinding forces or curvature, wherein the film is optionally configured as a printed film,
at least unwinding forces of the film or curvature, wherein the film is optionally configured as a metalizing foil, and
the seal performance of the film used.

11. The method according to claim 1,
wherein
the evaluation criterion comprises at least a film formula or a film-related default optionally with pre-defined film properties, or at least one manufacturing parameter of the production device, or a default of the further processing device for the film.

12. The method according to claim 1,
wherein
in a selection of further production process data, which are determined for a film assigned to the further production process data, based on at least one previously determined correlation, at least an estimated result of the further processing of the assigned film, or an estimated behavior of the assigned film in the further processing is predicted.

13. The method according to claim 1,
wherein
the correlation is thereby determined, in that an assessment of the determined production process data and of the determined further processing data occurs at least
through the further processing device, or
through the production device, or
through a central processing device.

14. The method according to claim 1,
wherein
the correlation is thereby determined, in that a statistical assessment, optionally a regression analysis, is carried out, wherein the regression function is estimated based on at least the determined production process data or the further processing process data.

15. The method according to claim 1,
wherein
the correlation is thereby determined, in that a pattern recognition is carried out, optionally at least through a syntactic or statistical or structural pattern recognition,
wherein optionally the subsequent steps are provided:
preprocessing of at least the determined production process data or further processing process data, optionally such that at least a noise or outlier of the data is reduced,
at least obtaining of features or reducing of features, and
classification of the characteristics, wherein optionally the evaluation criterion defines the classes.

16. A system for evaluating at least one industrial process for film production of a plastic film or further processing with the film, including:
at least one production device for film production of the film, and
at least one further processing device for further processing with the same film,
wherein
for a data transmission, a transmission system is connected with the production device and the further processing device, so that production process data of the production device collected during the film production and further processing process data of the further processing device collected during the further processing can be provided, and are assessable to determine a correlation based on a process model configured to perform a predictive assessment between the production process data and the further processing process data, wherein, based on the correlation, an evaluation result is established wherein the further processing device is configured to adapt the further processing of the film based on the evaluation result.

17. The system according to claim 16,
wherein
the production device is formed at least as a film machine, or as a polymer reactor, or as a film extrusion machine, and or as a blown film machine, or as a cast film machine.

18. The system according to claim 16,
wherein
the further processing device is formed as at least one of the following film processing devices:
a stretch-wrapping machine,
a stretch hood,
a bagging machine, optionally a form, fill & seal bagging machine,
a deep-drawing machine,
a printing machine,
a metallizer,
a winder, optionally a film winding station,
a film machine, and
a shrink tunnel.

19. The system according to claim 16,
wherein
at least two or three further processing devices are provided, wherein the further processing process data are determinable on each of the further processing devices, wherein the respectively determined further processing process data are permanently assignable to the production process data, in particular based on a higher-order identifier.

20. The system according to claim 16,
wherein
the production device or the further processing device comprises at least one interface device for connecting with the transmission system, wherein the interface device optionally includes at least a network interface, or a mobile radio interface, or a WLAN interface, or a Bluetooth interface, or a RFID interface.

21. The system according to claim 16, wherein
at least the production device or the further processing device includes a read-in device, in order to read-in an identifier of a product of the process, wherein the read-in device is optionally configured as a barcode scanner or a QR code scanner or as a RFID scanner or as a NFC sensor.

22. The system according to claim 16, wherein
at least first production process data are determined on a first production device, and at least second production process data are determined on a second production device, wherein the data transmission, at least for providing the first or second production process data, is carried out between the first production device and the second production device.

23. The system according to claim 16, wherein
at least first further processing process data are determined on a first further processing device, and at least second further processing process data are determined on a second further processing device, wherein the data transmission for providing at least the first or second further processing process data is carried out between the first further processing device and the second further processing device.

24. The system according to claim 16, wherein
at least the production device or the further processing device each comprise an interface device with at least a SIM card or an embedded SIM.

25. The system according to claim 16, further comprising a central processing device connected to the at least one production device and the at least one further processing device via the transmission system, wherein the central processing device comprises instructions stored thereon, which when executed by the central processing device, cause the central processing device to:
receive production process data from the production device,
receive further processing process data from the further processing device,
determine a correlation based on the process model configured to perform a predictive assessment between the production process data and the further processing process data, wherein at least one evaluation criterion is assessed, so that an evaluation result is established, and
provide at least the evaluation result or the production process data or the further processing process data.

26. A processing device for the evaluation of at least one industrial process for film production of a plastic film or further processing with the same film, including:
an interface unit to connect with a transmission system, wherein, through a data transmission, at least production process data collected during the film production or further processing process data collected during the further processing are transmittable, via the transmission system, to the processing device, an electronic processing unit, through which a correlation based on a process model configured to perform a predictive assessment is determinable between the production process data and the further processing process data, and wherein, based on the correlation, the electronic processing unit establishes an evaluation result, and
a non-volatile data storage unit for permanent storage of the correlation, and
wherein the evaluation result is transmitted, via the transmission system, to adapt the further processing of the film based on the evaluation result.

27. The processing device according to claim 26, wherein
the processing device comprises a device-specific identifier, so that, through a comparison of the device-specific identifier with a counter-identifier of a respective device of the process, an authentication of the device to the processing device can be carried out.

28. The processing device according to claim 26, wherein
the processing device is operable as a central processing device, at least according to a method, according to
a method for evaluating at least one industrial process for at least the film production of a film or further processing with the film, with
at least one production device, which is operated for the film production of the film, and
at least one further processing device, which is operated for the further processing with the film,
wherein
the following steps are carried out accompanying the process:
determining production process data on the production device in the film production,
determining further processing process data on the further processing device in the further processing,
carrying out of data transmission for the provision of at least the production process data or of the further processing process data,
determining a correlation between the production process data and the further processing process data, wherein at least one evaluation criterion is assessed, so that an evaluation result is established, and
at least providing the evaluation result or the production process data or the further processing process data,
or in a system according to
a system for evaluating at least one industrial process for film production of a film or further processing with the film, including:
at least one production device for film production of the film, and
at least one further processing device for further processing with the film,
wherein
for a data transmission, a transmission system is connected with the production device and the further processing device, so that production process data of the production device and further processing process data of the further processing device can be provided, and are assessable to determine a correlation, wherein, based on the correlation, an evaluation result is established.

29. A non-transitory computer program product for evaluating at least one industrial process for film production of a plastic film or further processing with the film, wherein the non-transitory computer program product is configured in such a manner that a method is operable according to:
a method for evaluating at least one industrial process for at least the film production of a film or further processing with the film, with at least one production device, which is operated for the film production of the film, and at least one further processing device, which is operated for the further processing with the same film, wherein the following steps are carried out accompanying the process:

determining production process data on the production device during the film production, determining further processing process data on the further processing device during the further processing, carrying out of data transmission for the provision of at least the production process data or of the further processing process data, determining a correlation based on a process model configured to perform a predictive assessment between the production process data and the further processing process data, wherein at least one evaluation criterion is assessed, so that an evaluation result is established, at least providing the evaluation result or the production process data or the further processing process data, and adapting the further processing of the film by the at least one further processing device based on the evaluation result.

30. The non-transitory computer program product according to claim 29, wherein the non-transitory computer program product is configured at least as ERP system or as internet- or network-based platform or as firmware or controlling software for at least one device of at least the process or as internet application or as a website or as an application operable via a network.

31. A method for evaluating at least one industrial process for at least the film production of a plastic film or further processing with the film, with at least one production device, which is operated for the film production of the film, and at least one further processing device, which is operated for the further processing with the film, wherein the at least one production device is arranged spatially separated from and independent of the at least one further processing device, and the following steps are carried out accompanying the process:

determining production process data on the production device in the film production, determining further processing process data on the further processing device in the further processing, carrying out of data transmission for the provision of at least the production process data or of the further processing process data, determining a correlation based on a process model configured to perform a predictive assessment between the production process data and the further processing process data, wherein at least one evaluation criterion is assessed, so that an evaluation result is established, at least providing the evaluation result or the production process data or the further processing process data, and adapting the further processing of the film by the at least one further processing device based on the evaluation result.

32. A method for evaluating at least one industrial process for at least the film production of a plastic film or further processing with the film, with at least one production device, which is operated for the film production of the film, and at least one further processing device, which is operated for the further processing with the same film, wherein the following steps are carried out accompanying the process:

determining production process data on the production device during the film production, determining further processing process data on the further processing device during the further processing, carrying out of data transmission for the provision of at least the production process data or of the further processing process data, determining a correlation based on a process model configured to perform a predictive assessment between the production process data and the further processing process data, wherein at least one evaluation criterion is assessed, so that an evaluation result is established, at least providing the evaluation result or the production process data or the further processing process data, and adapting a process module located upstream of the film production based on the evaluation result in order to produce the film.

* * * * *